United States Patent [19]

Kato

[11] 4,166,601

[45] Sep. 4, 1979

[54] MOUNTING MEANS FOR DECORATIVE DEVICE

[76] Inventor: Chizuo Kato, No. 25-12, 2-chome, Higashi-Ohi, Shinagawa-ku, Tokyo-to, Japan

[21] Appl. No.: 851,302

[22] Filed: Nov. 14, 1977

[30] Foreign Application Priority Data

Apr. 15, 1977 [JP] Japan .............................. 52-47349[U]

[51] Int. Cl.² ............................................. F16M 13/00
[52] U.S. Cl. .................................. 248/226.3; 248/230
[58] Field of Search ............... 248/218.4, 219.2, 226.3, 248/230

[56] References Cited

U.S. PATENT DOCUMENTS

| 124,108 | 2/1872 | Anderson ........................ 269/103 X |
| 1,777,884 | 10/1930 | Horix ................................. 248/230 |
| 1,974,080 | 9/1934 | Marker et al. .................. 248/230 X |
| 2,769,895 | 11/1956 | Boord ........................... 248/226.3 X |
| 3,409,259 | 11/1968 | Cross .............................. 248/230 X |

Primary Examiner—William H. Schultz
Attorney, Agent, or Firm—Scrivener, Parker, Scrivener and Clarke

[57] ABSTRACT

A mounting device for attaching a decorative object to a support, said device comprising a U-shaped clamp carrying said decorative object, a pair of U-shaped packing members secured to the clamp within the opening thereof, said packing members embracing a support, and a U-shaped cover secured to said clamp.

2 Claims, 6 Drawing Figures

MOUNTING MEANS FOR DECORATIVE DEVICE

DETAILED DESCRIPTION OF THE INVENTION

The present invention relates to a device for decoration which may be easily mounted on a support such as a pole, a column, a pillar or the like.

In general, various indoor and outdoor decorative objects and ornaments have been mounted on supports such as poles, pillars, columns or the like and rigidly joined thereto with nails or screws. Alternatively, they are formed with mortise-like openings to be fitted over the supports, the dimensions of the openings being dependent on the sizes of the supports. The latter method has an inherent problem in that they cannot be readily fastened to the supports when the cross sectional configurations or outer dimensions of the latter are different from one another.

The present invention was made to overcome the above and other problems encountered in the prior art decoration or ornament mounting devices.

The present invention will become apparent from the following description of one preferred embodiment thereof taken in conjunction with the accompanying drawings, in which.

Figure 1:
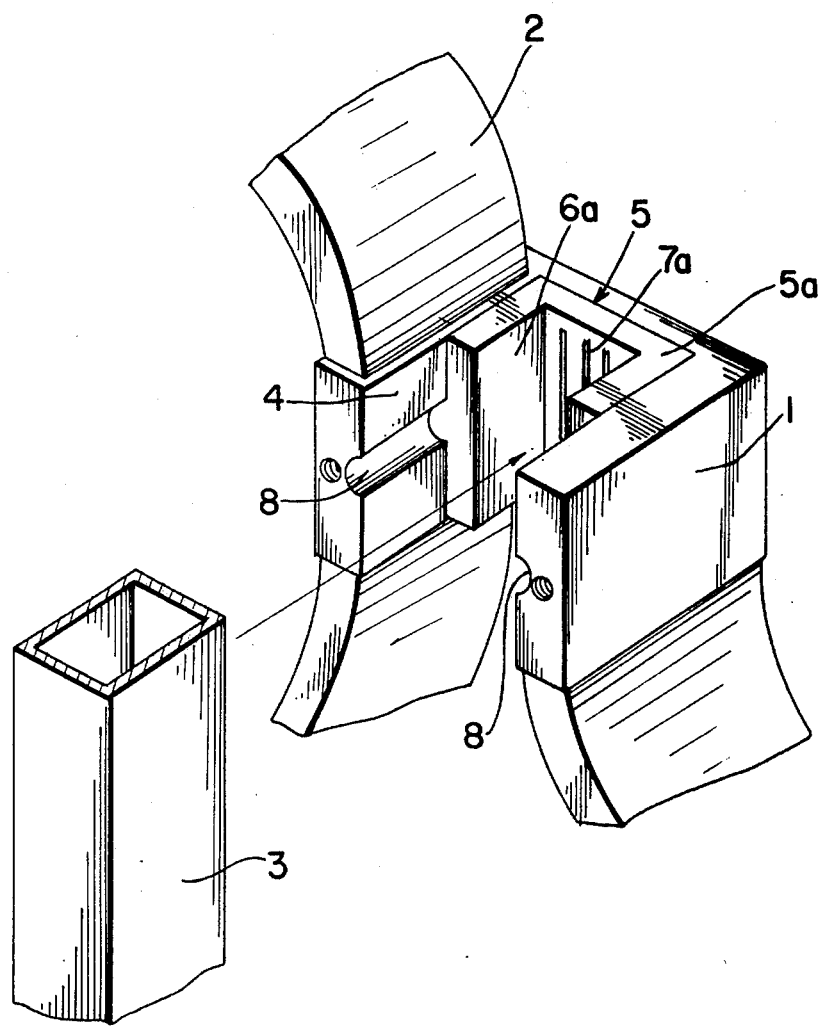
FIGS. 1-3 are views used for the explanation of the construction and arrangement of a device for decoration in accordance with the present invention and for the explanation of the mode of mounting thereof on a support.
Figure 2:
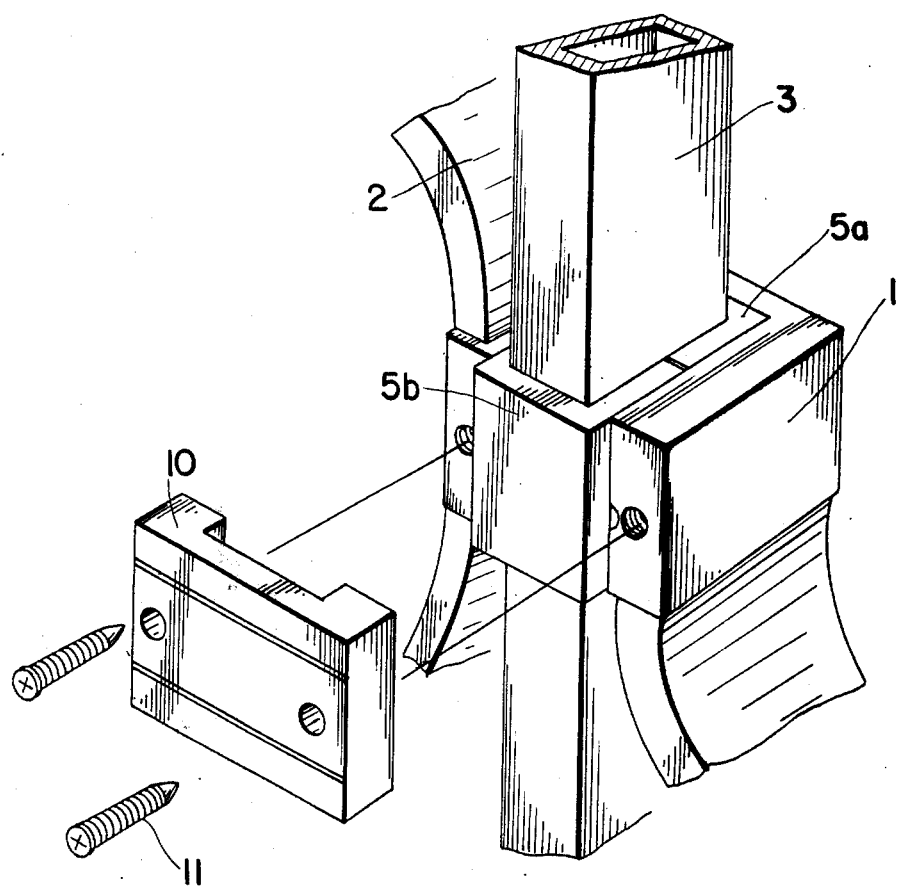
Figure 3:
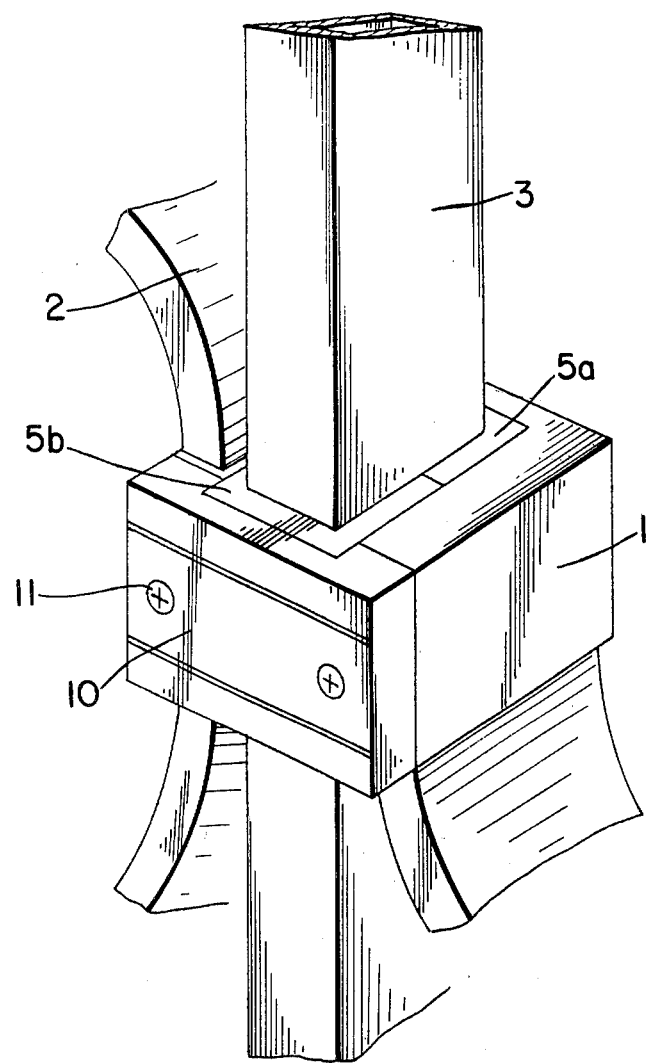

Referring to FIGS. 1-4, the preferred embodiment of a device for decoration in accordance with the present invention includes a split mounting or clamping means consisting of a large clamping section 1 and a small clamping section 10 (See FIG. 2) both U-shaped in cross section. The large clamping section 1 has an opening 4 which is made larger in size than the largest support 3 to be used. That is, the dimensions of the opening 4 are larger than the outer dimensions of the largest support 3. The large clamping section 1 is formed integral with a decorative object 2. The large and small clamping sections 1 and 10 are joined rigidly as will be described in more detail hereinafter with clamping screws or bolts 11 fitted through holes formed through the small clamping section 10 and screwed into tapped holes in the large clamping section 1.

Figure 4A:
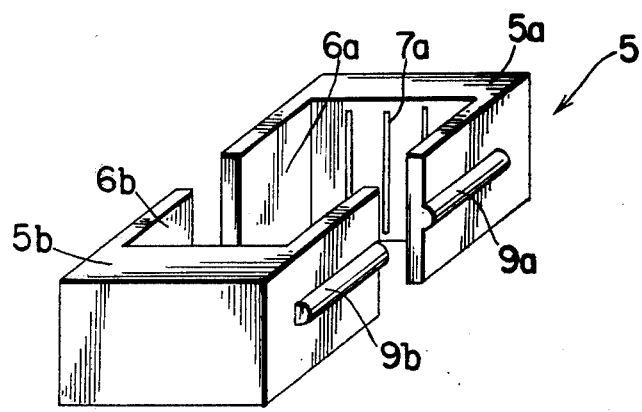
FIG. 4(A) is a perspective view of a packing means used in the present invention.
Figure 4B:
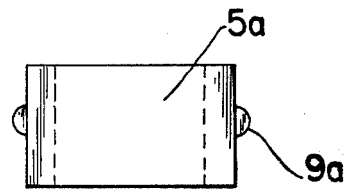
FIG. 4(B) is a side view thereof.
Figure 4C:
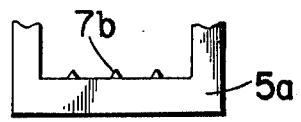
FIG. 4(C) is a view illustrating ridges formed on a bottom surface thereof.

The device for decoration further includes split packing means 5 consisting of two halves 5a and 5b both U-shaped in cross section and having such dimensions that they may be snugly fitted into the opening defined by the large and small clamping sections 1 and 10. As best shown in FIG. 4, both packing halves 5a and 5b which are made of a metal are similar in construction and have vertical ridges 7a and 7b formed on the bottom of openings 6a and 6b and horizontal ridges 9a and 9b formed on the parallel exterior side surfaces and adapted to be snugly fitted into horizontal mating slots 8 (See FIG. 1) formed in the parallel interior side surfaces of the large clamping section 1.

Next the mode of mounting or clamping the device for decoration on the support 3 will be described. First one of the packing halves (the packing half 5a in this embodiment) is inserted into the clamping opening 4 of the large clamping section 1 with the horizontal ridges 9a of the packing half 5 being snugly fitted into the mating slots 8 of the large clamping section 1 (See FIG. 1). Next the support 3 is fitted into the clamping opening 6a of the packing half 5, and then the other packing half 5b is fitted into the opening 4 of the large clamping section 1 with the ridges b of the other packing half 5b being snugly fitted into the mating slots 8 of the large clamping section 1. Thereafter the small clamping section or cap 10 is joined to the large clamping section 1 with the clamping screws or bolts 11 (See FIG. 3). As the clamping screws or bolts 11 are tightened, the other packing half 5b is pressed against the one packing half 5a so that the ridges 7a and 7b on the bottoms of the packing halves 5a and 5b are pressed against the support 3 and are crushed. Thus the decorative object 2 may be completely mounted on the support 3.

The packing halves 5a and 5b have been so far described as having the U-shaped cross section, but it is to be understood that the cross section thereof; that is, the configuration of the clamping openings 6a and 6b may be selected depending upon the configuration of the support 3. Therefore the packing halves having various configurations and dimensions may be prepared so that the decorative object 2 may be mounted on any support 3. Furthermore various modifications may be effected within the scope of the present invention.

Since the present invention, as described above, provides the two-split packing which has the cross sectional configuration adapted to be snugly fitted into the holder and the opening having the cross sectional configuration adapted to be snugly fitted over a support to be decorated, the decorative object may be easily attached to any support without the modification of the holders in such manner that one half of said packing is preinserted into the holder of the decorative object. When the device for decoration is mounted on the support, one packing half is already snugly fitted into the clamping opening of the large clamping section so that the step for previously fitting a packing on the support may be eliminated and consequently the mounting is very simple and may be completed within a short time. Furthermore since the packing halves are made of metal, paints may be applied to the decorative device after it has been mounted on the support. Opposed to the packings made of a material such as rubber easily deformed by heat, the metal packing halves will not melt even at high temperatures required for painting or coating. Moreover both the decorative object and packing halves may be coated with the same color so that the quality of the device for decoration may be further enhanced.

What is claimed is:

1. Mounting means for a decorative device comprising a U-shaped holder having an opening at one side of said holder, said holder being formed integral with the decorative device, a cover adapted to be releasably joined to said holder for covering the opening, a two-split packing means made of metal and consisting of two packing halves having an outer configuration so that they may be removably snugly fitted into said holder and an opening with a cross sectional configuration adapted to be snugly fitted over a support, and matching convex and concave portions provided on the wall surfaces of said holder and on the outer surfaces of said packing means for interconnecting said holder and said packing means into a single unit, whereby said decorative device may be securely attached to said support.

2. A device for decoration as set forth in claim 1 wherein the interior side surfaces of said two packing halves which are made into contact with said support are formed with a plurality of ridges or projections.

* * * * *